United States Patent [19]

Erickson

[11] 3,972,018

[45] July 27, 1976

[54] ELECTROMECHANICAL TRANSDUCER

[75] Inventor: David J. Erickson, Jackson, Mich.

[73] Assignee: Sparton Corporation, Jackson, Mich.

[22] Filed: Aug. 10, 1972

[21] Appl. No.: 279,715

[52] U.S. Cl. .................................. 340/10; 310/9.1; 310/9.6; 340/8 LF; 340/9

[51] Int. Cl.[2] .......................................... H04B 13/00

[58] Field of Search .................... 340/8 R, 9, 10, 11, 340/12, 13, 17, 8 LF; 310/9.6, 9.1

[56] References Cited

UNITED STATES PATENTS

| | | | |
|---|---|---|---|
| 2,399,820 | 5/1946 | Morgan | 340/10 |
| 2,405,605 | 8/1946 | Goodale, Jr. et al. | 340/8 LF |
| 2,565,159 | 8/1951 | Williams | 340/10 X |
| 2,788,454 | 4/1957 | Zapponi | 340/10 UX |
| 2,795,709 | 6/1957 | Camp | 340/8 MM |
| 2,876,427 | 3/1959 | Harris | 340/8 R X |
| 3,073,203 | 1/1963 | Evans | 310/9.6 X |
| 3,230,504 | 1/1966 | Horan et al. | 310/9.6 X |
| 3,489,997 | 1/1970 | Morris | 340/17 X |

*Primary Examiner*—Harold Tudor
*Attorney, Agent, or Firm*—Beaman & Beaman

[57] ABSTRACT

An electromechanical transducer employing an arcuate piezoelectric shell element having lateral edges affixed to a restraining member wherein stresses produced in the element by electrical energy produce element flexural vibrations. The piezoelectric shell element and restraining member are located within a chamber defined by a boot and rigid end caps attached to the restraining member. Hydraulic fluid within the transducer chamber equalizes pressures upon the shell element functioning as an acoustic coupling and as a pressure equalizer. In an embodiment of the invention a pair of piezoelectric shell elements are attached to opposite sides of a planar restraining plate.

4 Claims, 9 Drawing Figures

ELECTROMECHANICAL TRANSDUCER

BACKGROUND OF THE INVENTION

The invention pertains to transducers utilizing piezoelectric elements for producing vibrations.

Transducers used in marine applications for producing underwater sound vibrations such as used in submarine detection, underwater survey, sound detection and locating, and the like, often use piezoelectric elements energized by electrical energy for mechanically vibrating a diaphragm or shell to produce the desired vibrations. One common piezoelectric transducer consists of a stack of piezoelectric ceramic disks or bars wired in parallel to produce longitudinal vibration in contact with a metallic shell. As the shell lengthens and contracts due to stresses within the piezoelectric disks or bars, the sides of the shell are extended or retracted producing a mechanical movement capable of producing vibrations. The system vibrates at the resonant frequency of the shell, and this type of transducer is of a relatively small size, lightweight and has a high power capability, and has advantages over transducers employing cylinders or mass loaded stacks. Examples of this type of transducer are shown in U.S. Pat. Nos. 3,274,537 and 3,277,433.

However, transducers constructed in accord with the aforedescribed construction are expensive to manufacture, and with many transducers of this type the underwater depth at which operation is possible is limited.

SUMMARY OF THE INVENTION

It is an object of the invention to provide an electromechanical transducer which is of an economical construction, capable of producing a horizontal omnidirectional radiaton pattern, and usable at great ocean depths.

In the practice of the invention an arcuate piezoelectric shell element having lateral edges defining the extent of the arc configuration, and ends defining the axial extent of the element, is affixed to a restraining member at its edges. Electrodes mounted upon the outer convex shell element surface, and upon the inner concave element surface, energize the piezoelectric element causing stresses within the element resulting in flexure thereof. As the element is restrained against movement at its edges by the restraining member, flexure of the element occurs intermediate the edges, and the shell itself acts both as a drive mechanism and a radiating face.

Preferably, the shell element constitutes a cylindrical arc segment of uniform radial wall thickness subscribing approximately 150°. The electrodes mounted upon the shell element surfaces may consist of a silver foil affixed to the surfaces upon which the energizing AC voltage are impressed.

In the preferred embodiment the shell element is bonded to a restraining member taking the form of a planar plate of metal or rigid material, and the plate has a longitudinal length slightly greater than the longitudinal length of the shell element. The end caps are mounted upon the ends of the restraining plate, and a flexible boot is bonded to the periphery of the end caps defining a chamber in which the shell element and restraining plate are located. A fluid, such as an oil, fills the transducer chamber as defined by the boot and end caps, and the gap existing between the ends of the shell element and end caps permits the oil to surround the shell element equalizing the pressure on both sides thereof. This equalizing of pressure permits the transducer to be used at great depths, and the transducer of the invention is capable of operating at pressures greater than 10,000 psi.

The transducer may employ a single ceramic shell element, or a pair of similarly shaped elements may be affixed to a common restraining plate wherein the shell elements and plate, as assembled, are substantially of a cylindrical configuration. Whether the single or double shell element construction is employed, similar operating and constructional advantages are present. It is therefore an object of the invention to provide an economically producible electromechanical transducer having a high efficiency capable of producing low frequency vibrations with high power, and capable of efficient operation at extreme underwater depths.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENTS

Figure 1:
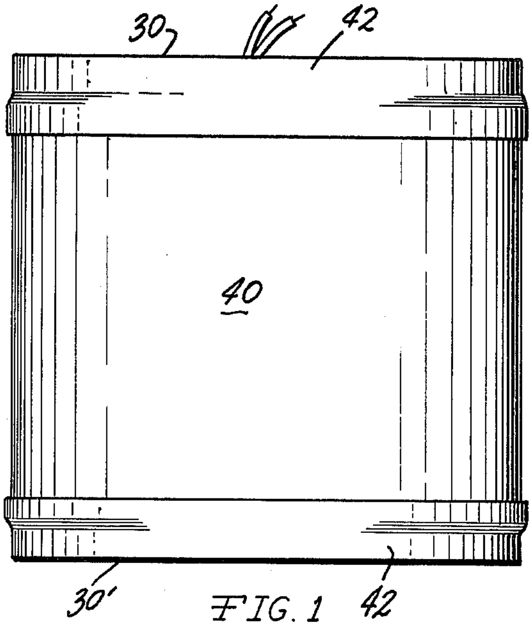
FIG. 1 is an elevational view of a transducer constructed in accord with the invention utilizing two piezoelectric shell elements.

In both the embodiments shown in FIGS. 1 through 5, and the single shell element embodiment shown in FIGS. 6 through 9, the transducer comprises similar basic components. These components consist of an arcuate piezoelectric ceramic shell element affixed to a restraining member in the form of a plate. End caps are attached to the restraining member, and a flexible boot is interposed between the end caps definig a chamber for the transducer working components. The chamber is filled with an oil, and port means permit the oil to surround the shell element.

With reference to FIGS. 1 through 5, the double shell element embodiment includes a pair of arcuate piezoelectric shell elements 10 and 10' formed of a piezoelectric material. The elements comprise ceramic arcs, preferably in the form of cylindrical segments of uniform radial wall thickness produced by cutting a ceramic piezoelectric cylinder. A number of piezoelectric materials are suitable for use in the shell element such as lead zirconate-lead titanate, ADP, lithium sulphate and PZT ceramics.

The shell elements 10 and 10′ are of identical construction and each include longitudinally extending lateral edges 12 defining the arcuate extent of the elements, which is preferably approximately 150°. The longitudinal length of the elements is defined by the end edges 14, which preferably lie in planes perpendicular to the associated element length.

The convex outer surface 16 of the shell elements supports a silver foil electrode 18, while the inner concave shell element surfaces 20 support a silver foil electrode 22 bonded thereto in a known manner.

The regions of the ceramic shell elements adjacent the edges 12 are restrained against mechanical movement by a stiffener or restraining plate 24, which may be formed of a metal or similar rigid material. As will be appreciated in FIG. 4, the outer regions of the plate 24 are formed with obliquely disposed surfaces 26 which correspond to the engaging shell element edges 12. The shell element edges 12 are bonded to the surfaces 26 by epoxy cement.

Figure 2:
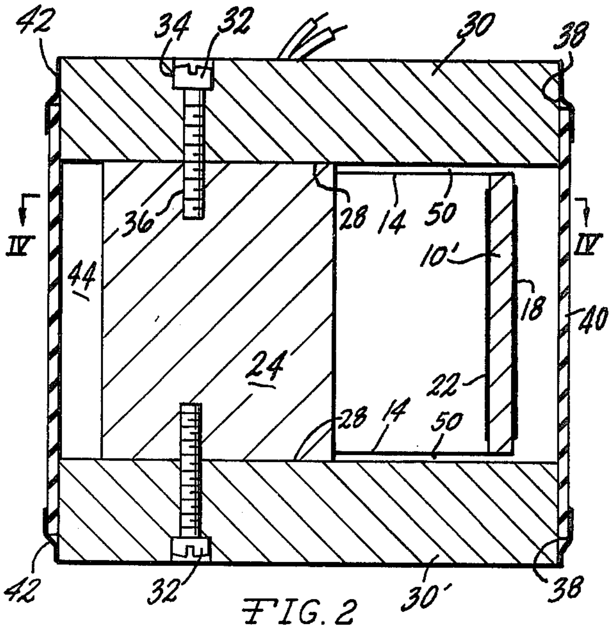
FIG. 2 is an elevational, sectional view taken through the transducer along Section II—II of FIG. 4.

The length of the plate 24 is defined by end edges 28, FIG. 2, and the length of the plate is greater than the axial length of the shell elements 10 and 10′ bonded thereto, as will be apparent in FIG. 2. End caps 30 and 30′, which may be of a metal, or other suitable material, are attached to the plate ends 28 by screws 32 extending through holes 34 defined in the caps threaded into threaded bores 36 formed in the plate 24.

Figure 3:
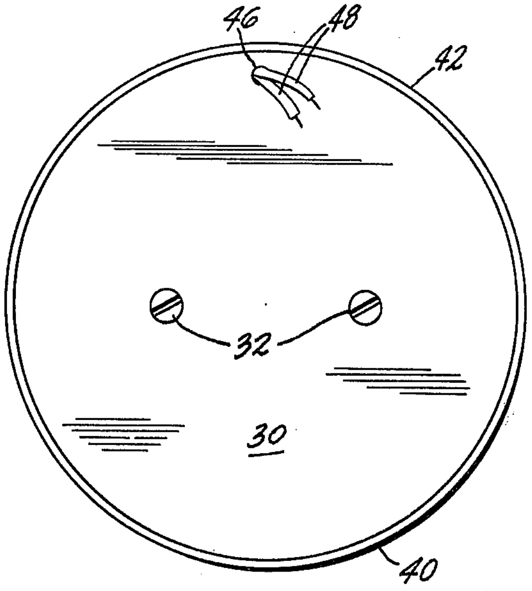
FIG. 3 is a top plan view of the transducer with respect to FIG. 1.
Figure 4:
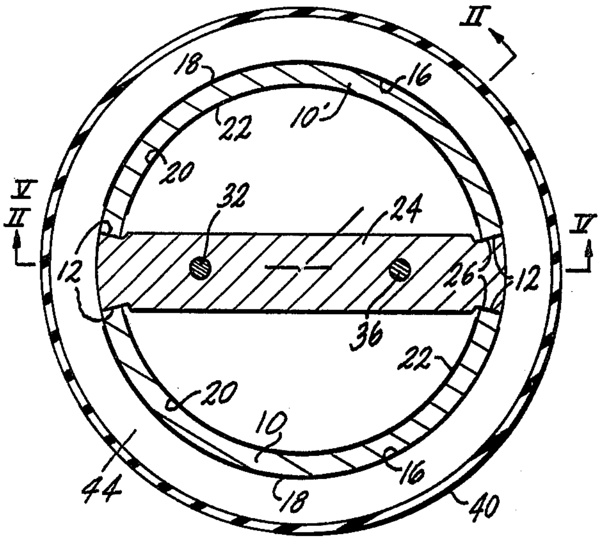
FIG. 4 is an elevational, sectional view taken through Section IV—IV of FIG. 2.
Figure 5:
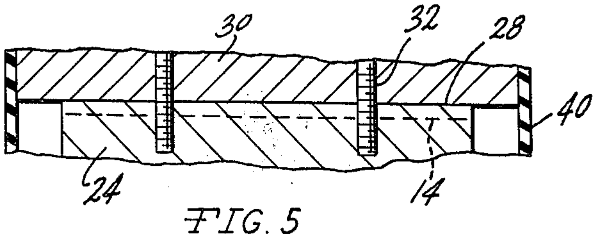
FIG. 5 is an enlarged, detail, elevational, sectional view of the junction of the upper end cap with the restraining plate as taken along Section V—V of FIG. 4.
Figure 6:
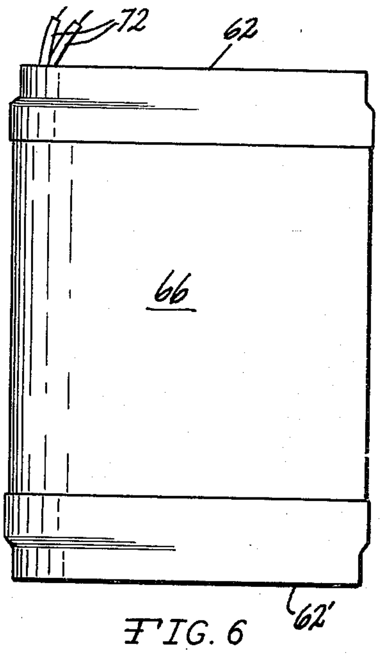
FIG. 6 is an elevational view of another transducer embodiment in accord with the concepts of the invention.
Figure 7:
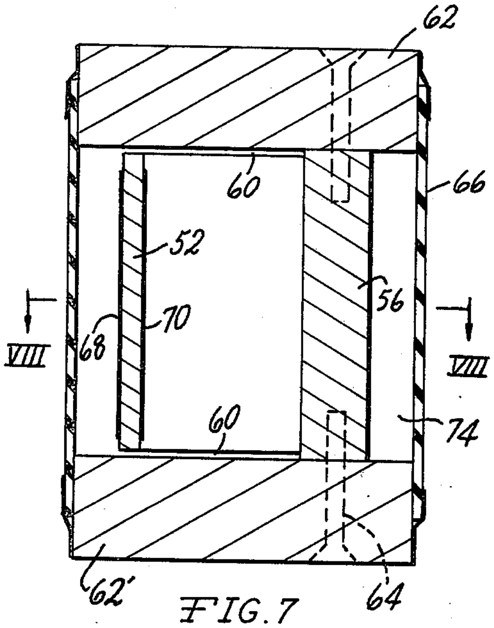
FIG. 7 is an elevational, sectional view of the embodiment of FIG. 6 as taken along Section VII—VII of FIG. 8.
Figure 8:
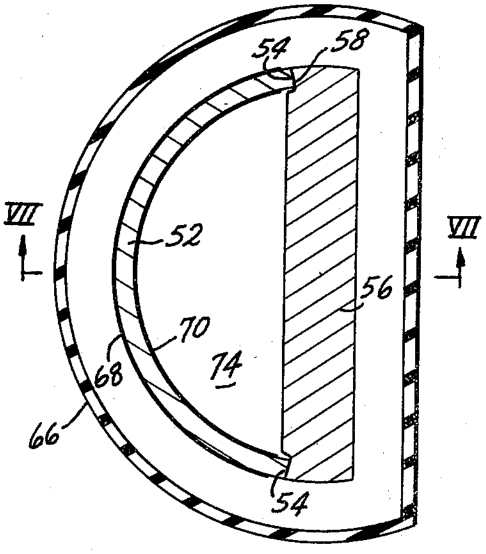
FIG. 8 is a plan, sectional view of the embodiment of FIG. 7 as taken along Section VIII—VIII thereof.
Figure 9:
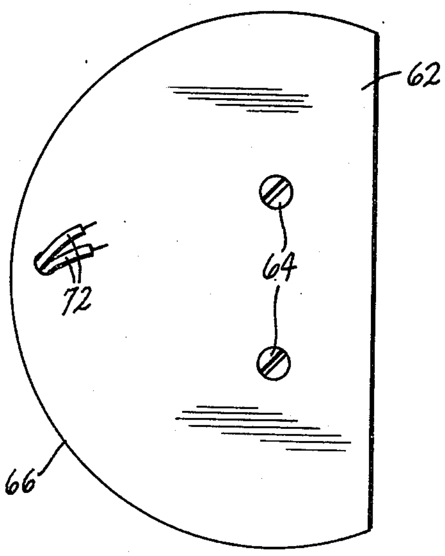
FIG. 9 is a top plan view of the transducer embodiment of FIG. 6.

The end caps 30 and 30′ are of a circular configuration, FIG. 3, and include cylindrical peripheries 38 upon which a cylindrical annular boot 40 of rubber or similar flexible elastic material is bonded by means of a tape 42 or suitable material. The boot 40 and end caps 30 and 30′ define a chamber 44 in which the shell elements 10 and 10′ and plate 24 are enclosed.

An opening 46 is defined in end cap 30, FIG. 3, through which electrical conductors 48 pass in a sealed manner. The conductors 48 are attached to the shell elements electrodes 18 and 22. The outer electrodes 18 are electrically interconnected by a conductor, not shown, and the inner electrodes 22 are likewise electrically interconnected by a suitable conductor, not shown. Thus, the elements 10 and 10′ are connected in parallel, and the electrodes thereof are supplied by the conductors 48 which are attached to a suitable AC voltage source.

The chamber 44 is filled with a fluid, such as oil, whereby both sides of the shell elements are submerged in the oil. The gap 50 existing between the end caps 30 and 20′ and the shell elements' ends 14 function as a port establishing unrestricted communication between the inner and outer sides of the shell elements, and thus the pressure exerted upon opposite sides of the shell elements is equal, as well as the pressure exerted upon opposite sides of the restraining plate 24.

In use, the transducer is submerged in water, and may be placed at extreme depth, if desired. Water pressure acting upon the boot 40 compresses the oil within the chamber 44 which equalizes the pressure acting upon opposite sides of the shell elements 10 and 10′. Thus, due to an equalization of pressure within the chamber to the pressure external of the transducer, extreme operating depths are feasible without requiring expensive and complicated sealing and pressure sealing means.

An AC voltage is impressed upon the electrodes 18 and 22 causing stresses to occur within the piezoelectric material shell elements. Such stresses within the shell elements cause the elements to vibrate in flexure as the ends of the elements are mechanically restrained against movement due to their bonding to the restraining plate 24. If the frequency of the applied voltage corresponds to one of the natural of "resonant" frequencies of the shell elements, a maximum response is obtained, and preferably, the frequencies applied to the electrodes are such as to produce the maximum response from the ceramic material. In an arc configuration as disclosed the expression for the natural frequencies is given below:

$$f_r = \lambda n \left[ \left( \frac{T}{R^2} \right) \left( \frac{C}{2\pi \sqrt{12}} \right) \right]$$

wherein T equals the thickness of the shell element arc, R is the radius of the shell element, C is the sound velocity within the ceramic element material, and *n* is a constant (function of shell element arc length).

As the shell elements function as both the drive mechanism and the vibration radiating face, a simplification of transducer structure is produced resulting in a more economic construction than is possible with many types of transducers of similar capacity and operation. The embodiment of FIGS. 1 through 5 is particularly capable of maintaining a symmetrical horizontal radiation pattern, however, accepted omnidirectional radiation patterns may be achieved with the environment of FIGS. 6 through 9 by maintaining the shell element surfaces at a dimension smaller than the wave length in water at 2kHz. Preferably the shell elements are resonant at 2kHz.

Conventional air backed transducers are not usable at submarine depths which the transducer of the invention may be employed as unbalanced hydrostatic pressure generates large stresses which adversely affect the piezoelectric properties of the ceramic material. The effect of such hydrostatic pressures on balanced hydrostatic transducer systems is much less than that for unbalanced or unidirectional stresses.

In the embodiment of FIGS. 6 through 9 components are illustrated which function in a manner identical to that of the embodiment of FIGS. 1 through 5. However, in this embodiment only a single piezoelectric material shell element 52 is employed, and in effect, the embodiment of FIGS. 6 through 9 comprises a transducer which is substantially of a configuration one half of that of the embodiment of FIGS. 1 through 5.

The shell element 52 is bonded at its lateral edges 54 to restraining plate 56 having surfaces 58 defined thereon for engaging the element edges. The restraining plate 56 is of an actual axial length slightly greater than that of the axial length of the shell element 52 such that a gap 60 exists between the end plate and the associated element ends. The end caps 62 and 62′ are attached to the restraining plate 56 by screws 64, and as will be appreciated from FIG. 9, the end caps are of a "D" peripheral configuration.

The boot 66 of flexible material is also of a "D" configuration and is sealed to the periphery of the end caps by tape or the like. The shell element 52 includes an outer silver foil electrode 68 and an inner silver foil electrode 70 which are connected to the AC power source by conductors 72, FIG. 9.

Operation of the transducer embodiment of FIGS. 6 through 9 is identical to that of FIGS. 1 through 5 and the chamber 74 is filled with oil to permit equal hydrostatic pressures upon the sides of the shell element 52. It is previously mentioned, the preferred arcuate length of the shell element is 150°.

It is appreciated that various modifications to the inventive concept may be apparent to those skilled in the art without departing from the spirit and scope of the invention.

I claim:

1. An electromechanical transducer utilizing an arcuate piezoelectric element vibrating in flexure comprising, in combination, a piezoelectric element of arcuate bowed configuration having an axis, a convex outer surface, a concave inner surface and spaced lateral edges defining the limits of the element's arcuate configuration, a mechanical rigid restraining member affixed to said element's edges restraining said edges from movement relative to each other and restricting movement of said element to flexure intermediate said edges, an electrode affixed to at least one of said surfaces for energizing said element to produce flexure thereof, said element and said restraining member defining an inner chamber having ends, end caps attached to said restraining member extending over said chamber ends, a flexible boot affixed to and extending between said end caps enclosing said element and restraining member defining an outer chamber within which said element and restraining member are encased, a fluid within said outer and inner chambers, and port means establishing communication between said outer and inner chamber.

2. An electromechanical transducer utilizing an arcuate piezoelectric element vibrating in flexure comprising, in combination, a first piezoelectric element of arcuate configuration having an axis and constituting a segment of a cylinder and including an axial length, arc defining edges, axial length defining ends and inner and outer surfaces, a mechanically rigid restraining plate extending between said element arc defining edges having a length defined by plate ends, said element arc defining edges being affixed to said plate, the length of said plate being greater than the axial length of said element whereby said plate ends extend beyond said element axial length defining ends, an end cap mounted upon each end of said plate extending over said element length defining ends whereby a gap exists between said end caps and the adjacent length defining ends, an electrode mounted upon said element outer surface, an electrode mounted upon said element inner surface said end caps having a periphery, a flexible boot mounted upon said end caps' periphery and extending between said end caps enclosing said plate and element, and a fluid within said boot surrounding said element.

3. An electromechanical transducer as in claim 2 wherein said element is of substantially uniform wall thickness whereby the distance separating said surfaces is substantially uniform throughout the configuration of said element.

4. An electromechanical transducer as in claim 2 wherein said restraining plate has first and second sides, said first element extending from said plate first side, a second piezoelectric element of identical cylindrical configuration as said first element having arc defining edges fixed to said plate second side, said end caps extending over both of said piezoelectric elements, and electrodes mounted upon the inner and outer surfaces of said second element.

* * * * *